No. 784,937.                                             Patented March 14, 1905.

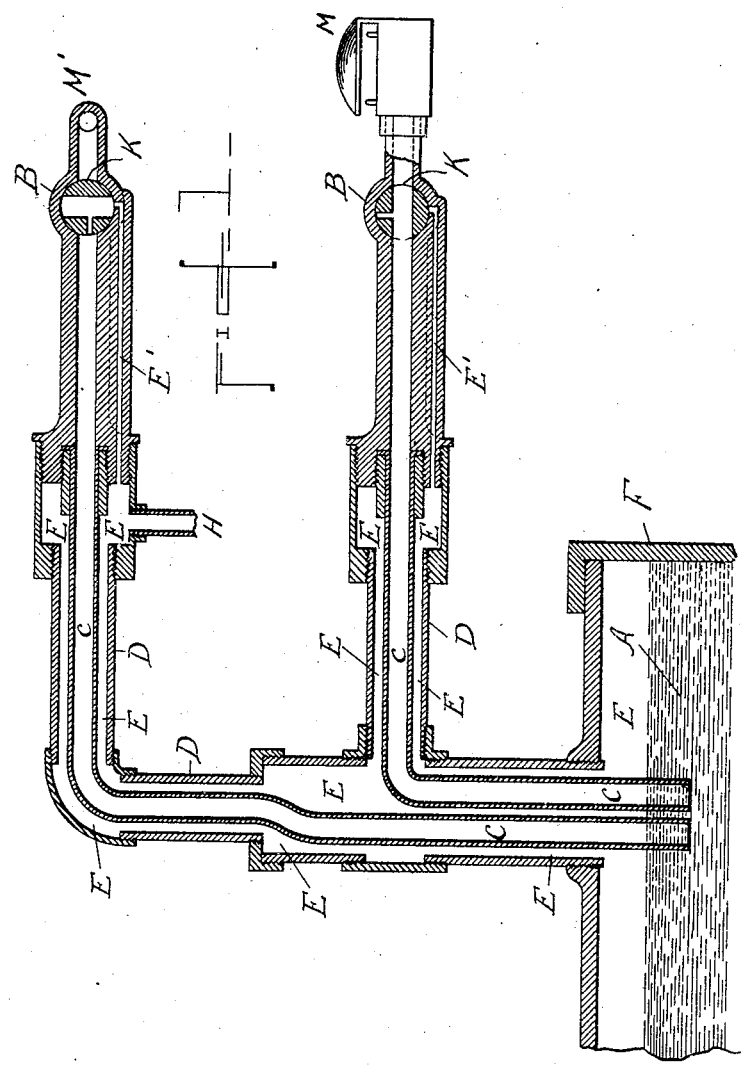

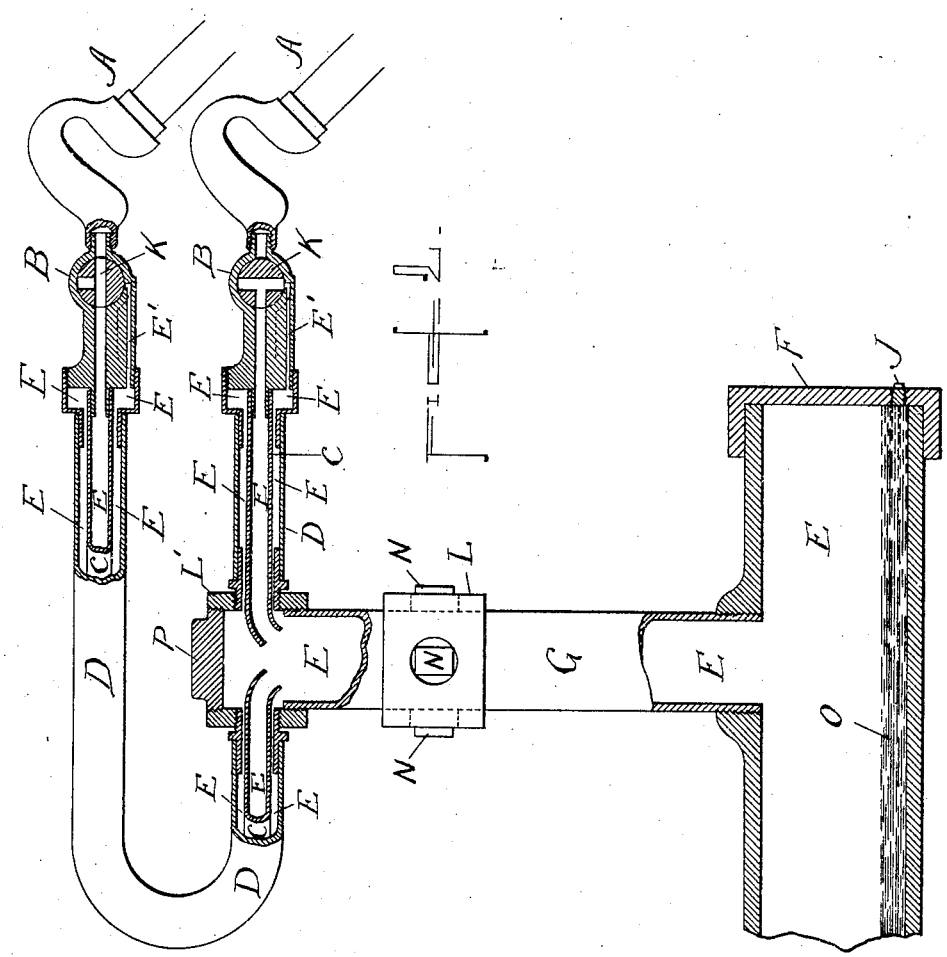

UNITED STATES PATENT OFFICE.

FLORENCE M. GRISWOLD, OF ESSEX FELLS, NEW JERSEY.

PNEUMATIC DISTRIBUTING SYSTEM FOR FLUIDS.

SPECIFICATION forming part of Letters Patent No. 784,937, dated March 14, 1905.

Application filed April 12, 1904. Serial No. 202,879.

*To all whom it may concern:*

Be it known that I, FLORENCE M. GRISWOLD, a citizen of the United States, and a resident of Essex Fells, in the county of Essex and State of New Jersey, (with post-office address as above,) have invented certain new and useful Improvements in Pneumatic Distributing Systems for Fluids, of which the following is a specification.

My invention relates to improvements in means for controlling the flow of fluids in pipes.

The invention is especially useful in those systems for distribution of fluids through pipes or conduits in which the fluid consists of some inflammable liquid—such, for instance, as set out in my prior patent, No. 599,702, wherein I have shown and described a system in which the liquid is contained in a storage-tank and is forced therefrom through a pipe and valve controlling the delivery-outlet of the pipe by means of pressure of air or gas applied to the surface of the liquid contained in the tank. The apparatus forming the subject of my present application is not, however, confined to the distribution or delivery of fluids from the tank or source, but may also be employed in systems wherein gas or air is delivered under pressure through a suitable service or discharge pipe—as, for instance, in systems for distribution of power by compressed air or other gas. In my prior patent means are shown and described for placing an equalizing pressure upon the contents of the distributing or service pipe under certain conditions, whereby the liquid in said pipe may be caused to flow back from the outlet to the tank or source.

My present invention relates to an improvement in the relative disposition of the service-pipe and the pipe which furnished the equalizing pressure for the purpose of returning any liquid contained in the service-pipe to the tank, and in its broadest aspect my invention is applicable not only to systems of distributing liquids, as before stated, but to systems of pneumatic-power distribution.

My invention consists, broadly, in the combination, with a service or discharge pipe through which the fluid (be the same a liquid or a gas) is delivered, of a surrounding jacket or inclosure in which an equalizing pressure is maintained, said jacket or inclosure forming practically a second pipe, in which the service or discharge pipe is inclosed. When used for systems or apparatus in which fluid is delivered through the service-pipe by air or gas pressure, my invention is of particular utility, since by establishing in the inclosing pipe a pressure of air or gas which partakes of the pressure used to cause the fluid to flow through the service-pipe an efficient guard is provided against the escape of the fluid by rupture of said supply or service pipe by reason of the fact that the rupture of the external pipe which must first take place in order to reach the supply-pipe in the case of breakage from external causes will relieve the air or gas pressure on the fluid, and thus stop the flow, while internal rupture will simply establish an equalizing pressure that will cause the liquid to flow back into the tank.

In the case of pneumatic-power distribution the double pipe affords a convenient means whereby in connection with suitable ports and passages controlled by a valve or faucet any water of condensation in the power service-pipe may be returned to a suitable tank when said valve is closed to cut off the power from the tool.

In the accompanying drawings, Figure 1 is a general vertical section of apparatus embodying my invention as used for controlling the flow of fluids. Fig. 2 is simply a view, parts being shown in elevation, of my invention as employed in a pneumatic-power-distributing system wherein air or gas under pressure is supplied to suitable pneumatic tools.

Referring to Fig. 1, F is any suitable tank containing a body of liquid A, which is subjected to air or gas pressure for the purpose of forcing the same out of the tank into suitable service or delivery pipes, (indicated by the letter C.) Two such pipes are shown, which terminate or have connection with a suitable valve or faucet B, one of which controls the outlet to a gasolene-burner M and the other the outlet to a nozzle M'. Inclosing the pipe C is a pipe D, in which an equalizing air-pressure is maintained, preferably by connection with the spaces above the body of liquid A, where pressure is maintained for the purpose of causing the liquid in the pipe C to rise and pass out by way of the controlling faucets or valves B when the same are turned into position to open the outlet. Said valve B may be of any desired character, but is preferably a three-way valve having a taper plug K, formed with suitable ports or passages, as shown, whereby in one position of the valve, as shown in connection with the burner M, it may open the outlet for the liquid and at the same time close the port of the equalizing air-passage E' in the stem of the body or faucet, so as to shut off the supply of air-pressure from the spaces E to the pipe or passage C, while in the other position, as shown in connection with the device M', said valve closes the outlet for the liquid and establishes connection between the pipe C and the equalizing air-passage E'.

H indicates a suitable tube or connection by which air under pressure may be supplied to the tank F and spaces E. In the present case this connection is shown as made in the coupling which joins one of the faucets to the double piping C D, although, as will be obvious, it might be made at any other part of the system. When the fluid-outlet is closed, which is the case when the valve is in the position shown at the top of Fig. 1, the fluid is kept from rising in the pipe C from the tank F by means of the air-pressure applied through the equalizing air-passage E' to the delivery or outlet end of the pipe C. When, however, the valve is turned to the position shown in the lower portion of the figure, the air in the pipe C may escape through the mouth of the faucet, thereby releasing the pressure on the fluid at the foot of the pipe C and permitting the pressure in the tank to force the fluid through the pipe and out through the valve or faucet.

In practice it is preferred to use lead piping for the fluid or service pipe C in order that a one-piece pipe may be readily furnished from the supply A to the faucet B with one joint—namely, that where the body of the faucet and the pipe C are coupled—which joint may be an absolutely tight lead seal, and hence superior to any hard-metal supply-pipe, with numerous joints. The piping or inclosure D may, however, be wrought-iron of standard thickness, having couplings of any desired construction at the elbows or other parts and at the point where the body of the faucet is coupled thereto, so as to place the equalizing air-passage E' therein into connection with the pipe D and spaces E. The lead supply-pipe being incased for its whole length within the iron pipe D is protected thereby from mechanical injury, while, moreover, should damage occur from an external source sufficient to break the pipe D the only result would be the relief of air-pressure, so that the liquid could not rise in the pipe C, or if the flow be taking place the liquid would simply be returned by gravity to the tank F. Should internal rupture occur in the fluid-supply pipe during delivery, such rupture would serve the same purpose as does the equalizing air-passage E' and would establish an equalizing pressure, resulting in the return of the fluid to the tank.

In the system shown in Fig. 2, A A indicate pneumatic tools, the supply of power to which is controlled by the valves B, coupled to the double piping D E, which is joined by suitable couplings to a stand-pipe G, the latter being in connection with the air reservoir or accumulator F. L L' indicate manifold coupling blocks or sections of the stand-pipe G, the outlets of the lower one of which—namely, L—are shown closed by plugs N. The top of the stand-pipe is closed by the plug P. As well understood, the double pipe C D is in this case preferably of some flexible material, and the faucets or valves B are coupled thereto by couplings of suitable character. In this arrangement the turning of the valve B to cut off the flow of air to the tool through the pipe C establishes a connection between the piping D through the equalizing connection E' and the outlet end of the service-pipe C, resulting in sending back any water of condensation in the service-pipe C to the tank F, in which it is caught, as indicated at O, and withdrawn when desired by removing the plug J. This is an advantage in that the water thus forced back from the outlet will clean out the pipe and keep out scale and dust and prevent the same from returning through the pipe to the tool. It will be obvious that if the tool becomes clogged the three-way faucet controlling the flow of air to the same may be turned off and the tool removed and cleaned without putting the remainder of the system out of service.

What I claim as my invention is—

1. The combination with a service or discharge pipe for a fluid under pressure, of an inclosure for said pipe in which air or other gas is maintained under pressure, a faucet controlling the outlet of the service-pipe and valve ports and passages for establishing connection between the inclosure and the service-pipe when the faucet is closed thus establishing an equalizing pressure whereby any liquid in the service-pipe may be caused to flow back through the same, as and for the purpose described.

2. The combination with a service or discharge pipe for liquids, of a tank containing a body of liquid under air or gas pressure tending to force the liquid through said service-pipe, a pipe surrounding said service-pipe and communicating with the air or gas space in the tank, means for controlling the outlet of the service-pipe and means for establishing connection between the surrounding pipe and said service-pipe at, or near, the outlet, when the outlet is closed.

3. The combination with a fluid service or discharge pipe, of a surrounding jacket or inclosure in which an equalizing pressure is maintained and means for establishing connection between said inclosure and said service-pipe to cause any liquid contained therein to flow backward from the outlet of said service-pipe.

Signed at Baltimore, in the State of Maryland, this 11th day of April, A. D. 1904.

FLORENCE M. GRISWOLD.

Witnesses:
 AUG. W. BRADFORD,
 THOS. KELL BRADFORD.